United States Patent [19]

Tsai et al.

[11] Patent Number: 5,470,033
[45] Date of Patent: Nov. 28, 1995

[54] METHOD FOR CONTROLLING A CARRIER WHICH IS USED TO CARRY A FLIGHT VEHICLE

[76] Inventors: Yeong-Shyeong Tsai; Wang-Jr Li, both of No. 141, Fu Hsing Rd., Lu Chou Hsiang, Taipei Hsien, Taiwan

[21] Appl. No.: 281,918

[22] Filed: Jul. 28, 1994

[51] Int. Cl.⁶ .................................................. B64I 1/00
[52] U.S. Cl. .................. 244/110 E; 244/2; 244/116; 244/30; 104/245; 105/74
[58] Field of Search .................................. 244/2, 30, 50, 244/110 E, 116; 105/155, 1.2, 74; 104/110, 19, 22, 419, 245, 247, 246; 180/904

[56] References Cited

U.S. PATENT DOCUMENTS

| | | | |
|---|---|---|---|
| 2,181,656 | 11/1939 | Fleet et al. | 244/110 E |
| 2,246,716 | 6/1941 | Bottrill | 244/110 E |
| 2,399,461 | 4/1946 | Brown | 244/50 |
| 2,783,005 | 2/1957 | Kane | 244/110 E |
| 3,003,717 | 10/1961 | Booker | 244/2 |
| 3,128,066 | 4/1964 | Bailey | 244/110 E |
| 4,036,146 | 7/1977 | Tyus | 104/245 |
| 4,653,706 | 3/1987 | Ragiah | 244/110 E |
| 4,690,064 | 9/1987 | Owen | 105/144 |

FOREIGN PATENT DOCUMENTS

| | | | |
|---|---|---|---|
| 571697 | 10/1958 | Belgium | 104/119 |
| 2807984 | 5/1978 | Germany | 104/119 |

*Primary Examiner*—Andres Kashnikow
*Assistant Examiner*—Virna Lissi Mojica
*Attorney, Agent, or Firm*—Jones, Day, Reavis & Pogue

[57] ABSTRACT

A method is provided for controlling a carrier which is used to carry a flight vehicle, the method including (a) providing a carrier and a control system mounted on a lower side thereof; (b) sending a signal to a flight vehicle to decrease a velocity thereof for landing; (c) sensing a flight direction of the flight vehicle and instantaneous velocities thereof; and (d) accelerating the carrier to catch up with the flight vehicle at a location therebeneath and adjusting the velocity of the carrier to match with that of the flight vehicle such that the flight vehicle is able to smoothly land so as to be supported on a top surface of the carrier.

3 Claims, 3 Drawing Sheets

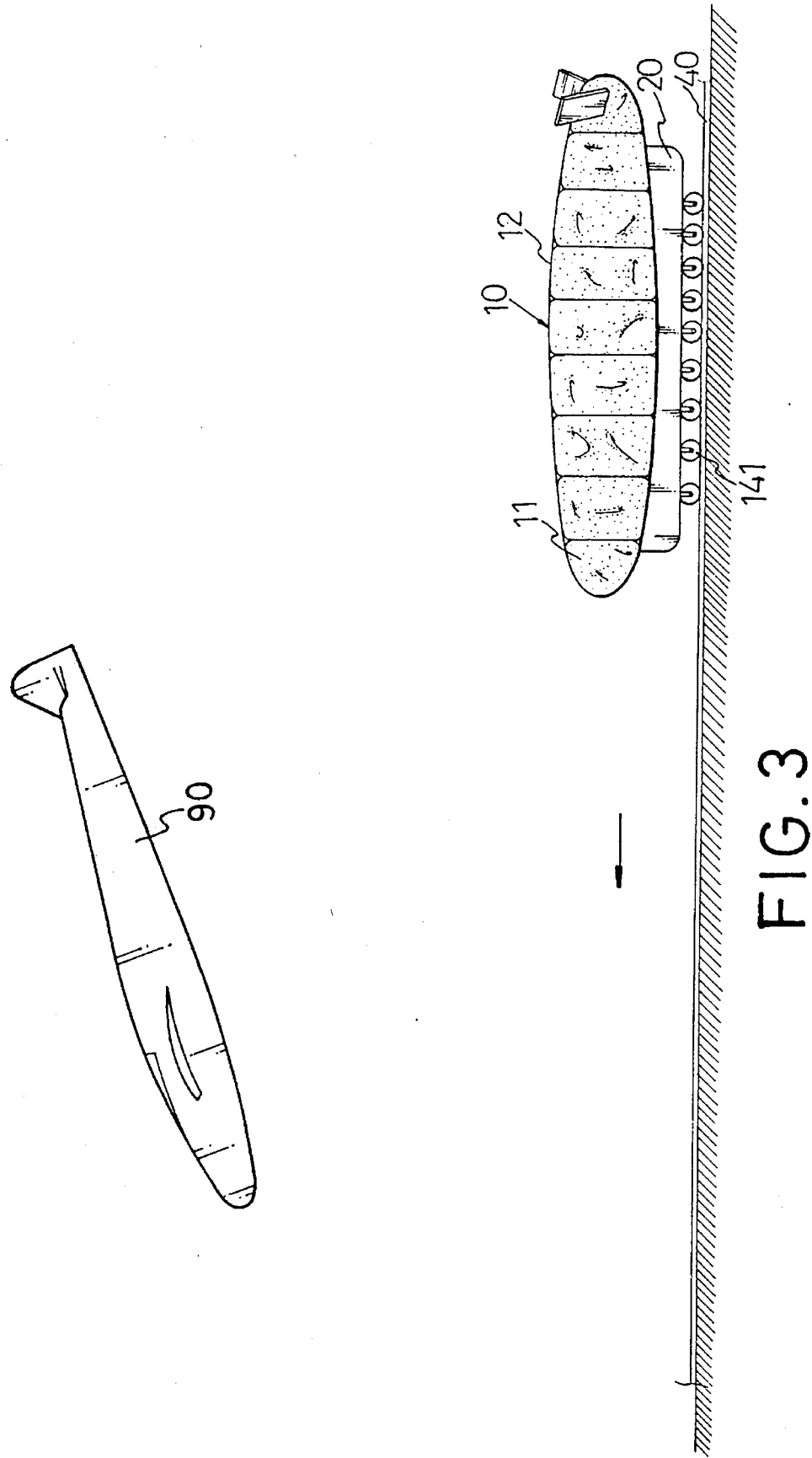

METHOD FOR CONTROLLING A CARRIER WHICH IS USED TO CARRY A FLIGHT VEHICLE

BACKGROUND OF THE INVENTION

1. Field of Invention

The present invention relates to a method for controlling a carrier, and more particularly to a method for controlling a carrier which is used to carry a flight vehicle.

2. Related Prior Art

A flight vehicle often requires a long distance for landing, so causing unsafety of the flight vehicle when landing if the distance for landing of the flight vehicle is not enough or too short.

The present invention has arisen to mitigate and/or obviate the above-mentioned disadvantages of the conventional method for controlling a carrier which is used to carry a flight vehicle.

SUMMARY OF THE INVENTION

The primary objective of the present invention is to provide a method for controlling a carrier which is used to carry a flight vehicle.

Another objective is to provide a carrier which is able to greatly reduce the length required for landing of the flight vehicle.

A further objective is to provide a carrier which is able to serve as a safety device for assisting and guiding landing of the flight vehicle.

In accordance with one aspect of the present invention, there is provided a method for controlling a carrier which is used to carry a flight vehicle, the method including (a) providing a carrier and a control system mounted on a lower side thereof; (b) sending a signal to a flight vehicle by the control system to decrease a velocity thereof for landing; (c) sensing a flight direction of the flight vehicle and instantaneous velocities thereof by the control system; and (d) accelerating the carrier by the control system to catch up with the flight vehicle at a location therebeneath and adjusting the velocity of the carrier to match with that of the flight vehicle such that the flight vehicle is able to smoothly land so as to be supported on a top surface of the carrier.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is a schematic operation view showing how the carrier catches up with a flight vehicle.

DETAILED DESCRIPTION OF THE PREFERRED EMBODIMENTS

Figure 1:
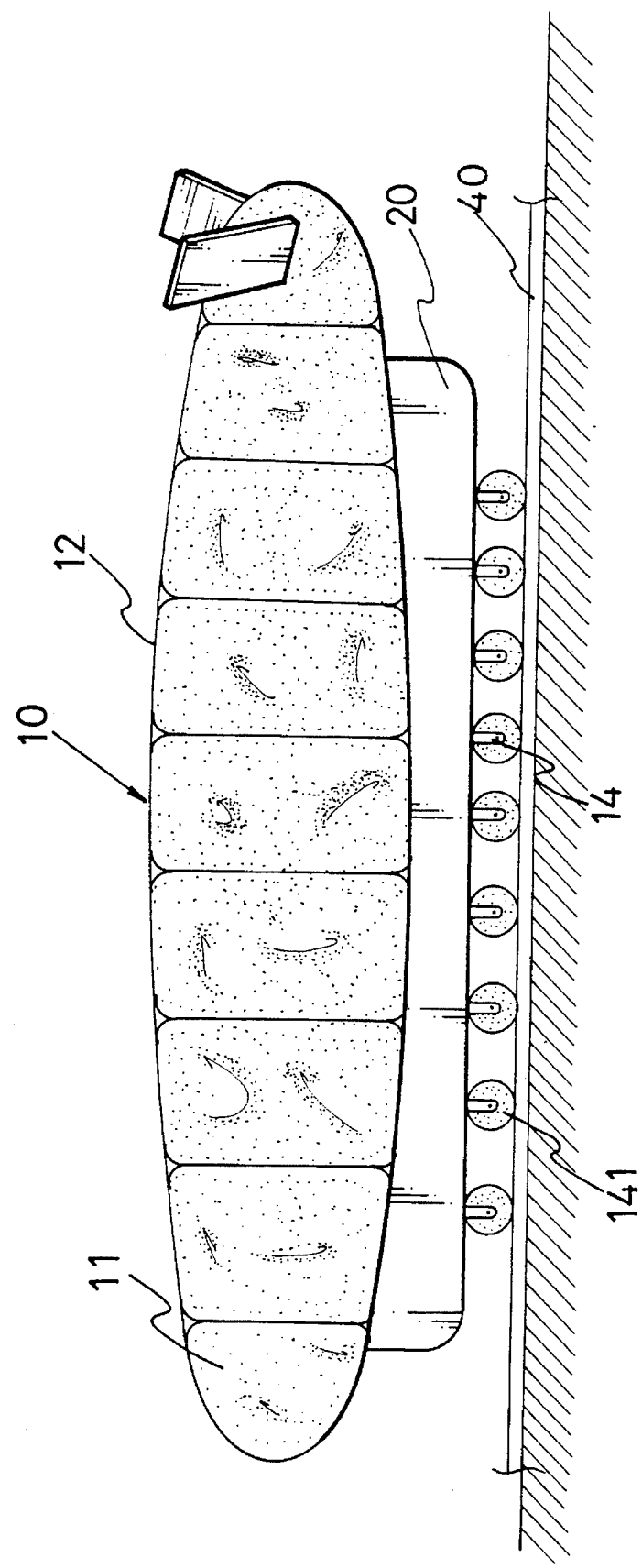
FIG. 1 is a schematic view of a carrier in accordance with the present invention.
Figure 2:
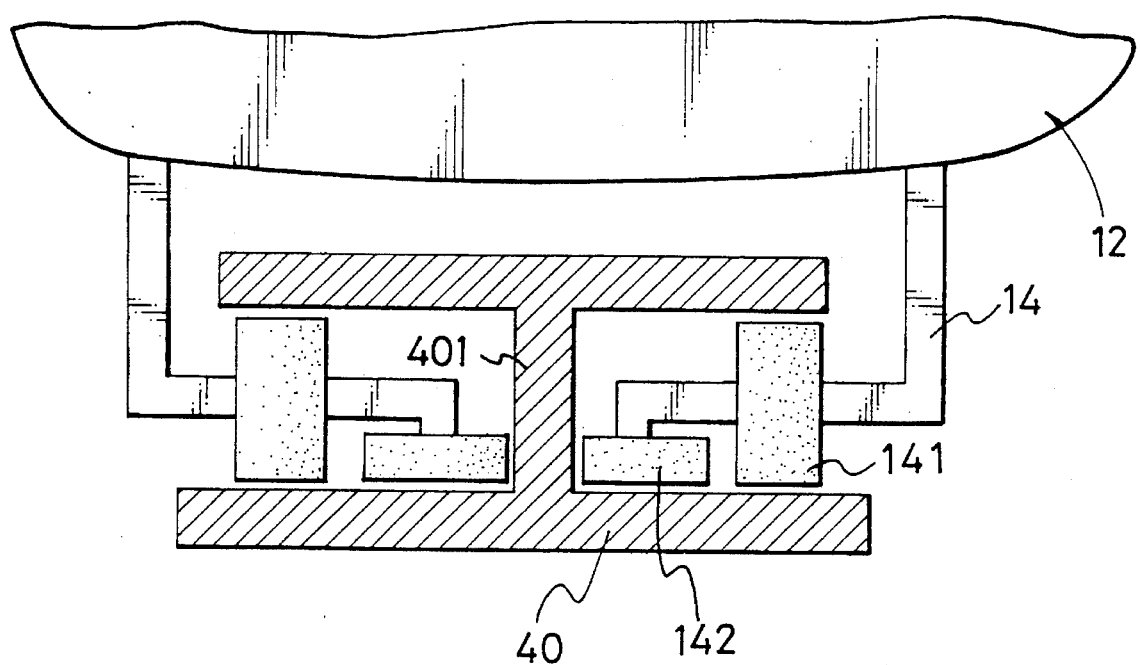
FIG. 2 is an enlarged cross-sectional view showing how the wheels roll in the substantially I-shaped track.

Referring to the drawings, and initially to FIGS. 1 and 3, a method in accordance with the present invention is provided for controlling a carrier 10 which is used to carry a flight vehicle 90, the method comprising (a) providing the carrier 10 and a control system 20 mounted on a lower side thereof; (b) sending a signal to the flight vehicle 90 by means of the control system 20 to decrease the velocity of the flight vehicle 90 for landing; (c) sensing the flight direction of the flight vehicle 90 and instantaneous velocities thereof by means of the control system 20; and (d) accelerating the carrier 10 by the control system 20 to catch up with the flight vehicle 90 at a location therebeneath and adjusting the velocity of the carrier 10 to match with that of the flight vehicle 90 such that the flight vehicle 90 is able to smoothly land so as to be supported on a top surface of the carrier 10.

preferably, the carrier 10 is limited to slide on a track 40 along a longitudinal direction thereof. Referring to FIG. 2, the track 40 is substantially I-shaped in section and defines two recesses therein, a plurality pairs of L-shaped fork members 14 being mounted on an underside of the control system 20, a pair of wheels 141 pivotally engaged with each of the pairs of fork members 14 to roll in the recesses of the I-shaped track 40 and a pair of wheels 142 pivotally engaged with each of the pairs of fork members 14 and abutting against a vertical wall 401 of the track 40 such that the carrier 10 is able to move straight along the track 40. In addition, the step (b) further comprises sending a signal to the flight vehicle 90 by means of the control system 20 to adjust the flight direction of the flight vehicle 90 along a longitudinal direction of the substantially I-shaped track 40 such that the flight vehicle 90 is able to move in the same direction as the carrier 10.

The control system 20 comprises a sensor device (not shown) for sensing and detecting the flight direction of the flight vehicle 90 and instantaneous velocities thereof, a 6 calculator device (not shown) for calculating and integrating data detected from the sensor device, a communication apparatus (not shown) for communicating with the flight vehicle 90, a stabilizer (not shown) for stabilizing communication between the flight vehicle 90 and the communication apparatus, and a power supply device (not shown) for accelerating the carrier 10 to catch up with the flight vehicle 90 at a location therebeneath. The power supply device is controlled by the calculator device for adjusting the instantaneous velocity of the carrier 10 to match with that of the flight vehicle 90 such that the relative velocity between the flight vehicle 90 and the carrier 10 approaches zero, whereby, the flight vehicle 90 is able to smoothly land so as to be safely supported on the carrier 10. Further, the carrier 10 is made of a buffer chamber 12 in which a plurality of bladders 11 filled with helium are received. In addition, the buffer chamber 12 is made of a material which is shock absorbing and fireproof. In this manner, the flight vehicle 90 is able to safely land on the carrier 10 due to the buffering and shock-absorbing functions of the buffer chamber 12 and the bladders 11.

Accordingly, by such an arrangement, the length required for landing of the flight vehicle is greatly reduced because the carrier is able to catch up with the flight vehicle as quickly as possible for carrying and supporting the flight vehicle so as to serve as a safe device for assisting and guiding landing of the flight vehicle.

It should be clear to those skilled in the art that further embodiments of the present invention may be made without departing from the teachings of the present invention.

I claim:

1. A method for controlling a carrier (10) which is used to carry flight vehicle (90), said method comprising:

(a) providing a carrier (10) and a control system (20) mounted on a lower side thereof, said carrier (10) being limited to slides on a track (40) along a longitudinal direction thereof, said track (40) being substantially I-shaped in section and defining two recesses therein and having a vertical wall (401), a plurality pairs of L-shaped fork members (14) being mounted on a underside of said control system (20), a pair of first wheels (141) pivotally engaged with each of said pairs of fork members (14) to roll in each of said recesses of said I-shaped track (40) and a pair of second wheels (142) pivotally engaged with each of said pairs of fork members (14) and abutting against said vertical wall (401) of said track (40);

(b) sending a signal to flight vehicle (90) by said control system (20) to decrease an instantaneous velocity thereof for landing and sending a signal to said flight vehicle (90) to adjust the flight direction thereof along a longitudinal direction of said substantially I-shaped track (40);

(c) sensing a flight direction of said flight vehicle (90) and instantaneous velocities thereof by said control system (20); and (d) accelerating said carrier (10) by said control systems (20) to catch up with said flight vehicle (90) at a location therebeneath and adjusting the velocity of said carrier (10) to match with that of said flight vehicle (90) such that said flight vehicle (90) is able to smoothly land so as to be supported on a top surface of said carrier (10).

2. The method in accordance with claim 1, wherein said carrier (10) is made of a buffer chamber (12), a plurality of bladders (11) being received in said buffer chamber (12) for absorbing shock.

3. The method in accordance with claim 2, wherein said buffer chamber (12) is made of a material which is shock-absorbing and fireproof.

* * * * *